(12) United States Patent
Qin et al.

(10) Patent No.: US 12,537,463 B1
(45) Date of Patent: Jan. 27, 2026

(54) VOLTAGE MODULATION METHOD AND THREE-LEVEL INVERTER

(71) Applicant: SHANGHAI SIGEYUAN INTELLIGENT TECHNOLOGY CO., LTD., Shanghai (CN)

(72) Inventors: Yijin Qin, Shanghai (CN); Ziwei Yu, Shanghai (CN); Jianwen Sun, Shanghai (CN)

(73) Assignee: SHANGHAI SIGEYUAN INTELLIGENT TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 19/223,009

(22) Filed: May 29, 2025

(30) Foreign Application Priority Data

Sep. 25, 2024 (CN) .......................... 202411338943.5

(51) Int. Cl.
*H02M 7/539* (2006.01)

(52) U.S. Cl.
CPC .................................. *H02M 7/539* (2013.01)

(58) Field of Classification Search
CPC ...... H02M 7/539; H02M 7/5395; H02M 7/54; H02M 7/56; H02M 7/5355; H02M 7/5387; H02M 7/53871; H02M 7/53873; H02M 7/53875
See application file for complete search history.

(56) References Cited

U.S. PATENT DOCUMENTS

| 2013/0308357 | A1* | 11/2013 | Amano | H02M 7/48 363/71 |
| 2014/0334213 | A1* | 11/2014 | Jussila | H02M 7/483 363/132 |
| 2019/0181774 | A1 | 6/2019 | Liu et al. | |

FOREIGN PATENT DOCUMENTS

| CN | 108512449 A | 9/2018 |
| CN | 114629224 A | 6/2022 |
| CN | 116827081 A | 9/2023 |
| JP | 2009296847 A | 12/2009 |

(Continued)

OTHER PUBLICATIONS

First Office Action from corresponding Chinese Application No. 202411338943.5, dated Oct. 31, 2024. English translation attached.

(Continued)

*Primary Examiner* — Nguyen Tran

(57) ABSTRACT

Provided are a voltage modulation method and a three-level inverter, belonging to the field of inverter control technologies. The voltage modulation method is applied to a three-level inverter circuit including a neutral line relay. The voltage modulation method includes: determining a desired output voltage for each phase of the three-level inverter circuit; obtaining, in response to the neutral line relay being in an on state, a positive half-bus voltage and a negative half-bus voltage in the three-level inverter circuit; determining, based on the positive half-bus voltage and the desired output voltage, a first switching duty cycle during a positive (Continued)

half-cycle; determining, based on the negative half-bus voltage and the desired output voltage, a second switching duty cycle during a negative half-cycle; and driving, based on the first switching duty cycle and the second switching duty cycle, the three-level inverter circuit to output the desired output voltage.

20 Claims, 2 Drawing Sheets

(56) References Cited

FOREIGN PATENT DOCUMENTS

WO    2022027892 A1    2/2022

OTHER PUBLICATIONS

The Grant Notice from corresponding Chinese Application No. 202411338943.5, dated Nov. 21, 2024. English translation attached.

Gui, Zaiyi et al. "A Novel Neutral-point Voltage Control Method for Three-level Inverter", Power Electronics, Issue 5, May 20, 2020 (May 20, 2020), full text.

Lak Mohammadreza et al.: "A Novel Hybrid Modulation For Photovoltaic Three-Level T-type Inverter To Simultaneously Eliminate Neutral-Point Voltage Ripple And Interact With Maximum Power Point Tracking Process", 2020 IEEE Energy Conversion Congress and Exposition (ECCE), IEEE, Oct. 11, 2020 (Oct. 11, 2020), pp. 2224-2230, XP033850952.

Wang Yuhao et al.: "Carrier-Based Modulation Scheme Plus Neutral-Point Current Control for Balancing Neutral- Point Voltage of Three-Phase Four-Leg Three-Level Inverter Over Entire Power Factor", 2024 IEEE Applied Power Electronics Conference and Exposition (APEC), IEEE, Feb. 25, 2024 (Feb. 25, 2024), pp. 1269-1274, XP034597929.

Extended European Search Report dated Nov. 24, 2025 received in corresponding European Application No. EP25182841.4.

* cited by examiner

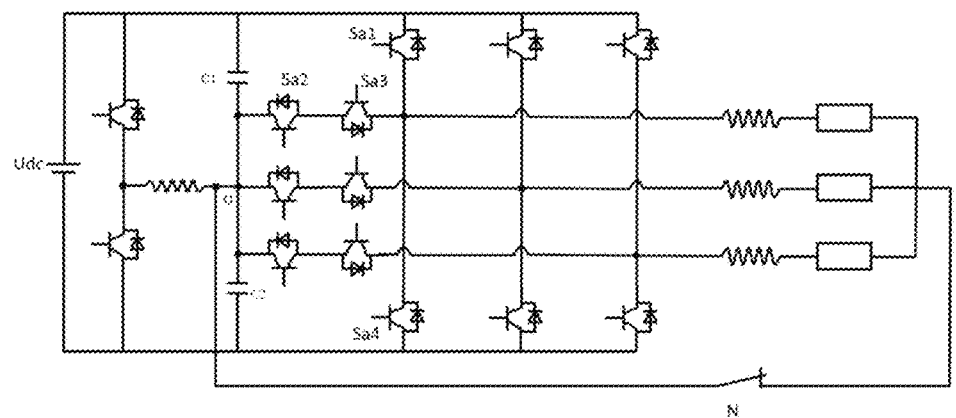
FIG. 1
| Output state | Output voltage level | Sa1 | Sa2 | Sa3 | Sa4 |
|---|---|---|---|---|---|
| 2 | $U_{pos}$ | 1 | 1 | 0 | 0 |
| 1 | 0 | 0 | 1 | 1 | 0 |
| 0 | $-U_{neg}$ | 0 | 0 | 1 | 1 |
FIG. 2
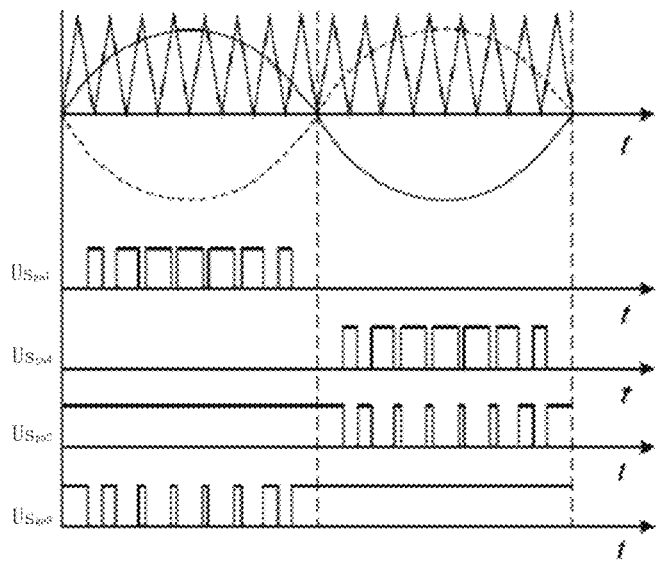
FIG. 3

VOLTAGE MODULATION METHOD AND THREE-LEVEL INVERTER

CROSS-REFERENCE TO RELATED APPLICATIONS

This application claims priority to Chinese Patent Application No. 202411338943.5 filed on Sep. 25, 2024, the entire disclosure of which is incorporated herein by reference.

FIELD

The present disclosure belongs to the field of inverter control technologies, and more particularly, to a voltage modulation method and a three-level inverter.

BACKGROUND

When performing voltage modulation, a three-level inverter typically calculates a duty cycle of each phase switch based on a bus voltage and a desired output voltage. The calculated duty cycle is then used to drive actions of respective switches to produce a corresponding output voltage. When there is a voltage difference between a positive bus and a negative bus, a current control method can cause deviations in the output voltage of the three-level inverter, introducing issues such as voltage and current harmonics.

SUMMARY

The present disclosure aims to solve at least one of the technical problems in the related art. To this end, the present disclosure provides a voltage modulation method and a three-level inverter, which can improve accuracy of an output voltage of the inverter and reduce harmonics of the output voltage and a current of the inverter.

In a first aspect, the present disclosure provides a voltage modulation method, which is applied to a three-level inverter circuit. The three-level inverter circuit includes a neutral line relay disposed at a neutral line of the three-level inverter circuit. The voltage modulation method includes: determining a desired output voltage for each phase of the three-level inverter circuit; obtaining, in response to the neutral line relay being in an on state, a positive half-bus voltage of a positive bus relative to a bus midpoint and a negative half-bus voltage of a negative bus relative to the bus midpoint that are detected in the three-level inverter circuit; determining, based on the positive half-bus voltage and the desired output voltage, a first switching duty cycle during a positive half-cycle; determining, based on the negative half-bus voltage and the desired output voltage, a second switching duty cycle during a negative half-cycle; and driving, based on the first switching duty cycle and the second switching duty cycle, the three-level inverter circuit to output the desired output voltage.

With the voltage modulation method according to the present disclosure, voltage modulation is performed based on the positive half-bus voltage, the negative half-bus voltage, and the desired output voltage. When there is an imbalance between the positive bus voltage and the negative bus voltage, an actual output voltage is not affected by voltage deviation, in such a manner that the actual output voltage is consistent with the desired voltage, and thus accuracy of the output voltage of the inverter circuit is improved, reducing harmonics of the output voltage and an output current of the inverter circuit.

According to one embodiment of the present disclosure, the first switching duty cycle is calculated as:

$$d1 = \frac{Ucmd}{Upos},$$

where $d1$ denotes the first switching duty cycle, $Ucmd$ denotes the desired output voltage, and $Upos$ denotes the positive half-bus voltage.

According to one embodiment of the present disclosure, the second switching duty cycle is calculated as:

$$d2 = \frac{Ucmd}{-Uneg},$$

where $d2$ denotes the second switching duty cycle, $Ucmd$ denotes the desired output voltage, and $Uneg$ denotes the negative half-bus voltage.

According to one embodiment of the present disclosure, the driving, based on the first switching duty cycle and the second switching duty cycle, the three-level inverter circuit to output the desired output voltage includes: in response to the desired output voltage being a positive voltage, modulating, based on the first switching duty cycle, an output voltage of the three-level inverter circuit between outputting the positive half-bus voltage and outputting a zero voltage to output the desired output voltage; and in response to the desired output voltage being a negative voltage, modulating, based on the second switching duty cycle, the output voltage of the three-level inverter circuit between outputting the negative half-bus voltage and outputting the zero voltage to output the desired output voltage.

According to one embodiment of the present disclosure, the three-level inverter circuit includes an upper bridge arm. The upper bridge arm includes related circuits outputting the positive bus voltage and a zero voltage. The upper bridge arm has a first terminal electrically connected to the positive bus and a second terminal electrically connected to the bus midpoint. The driving, based on the first switching duty cycle and the second switching duty cycle, the three-level inverter circuit to output the desired output voltage includes: in response to the desired output voltage being the positive voltage, driving, based on the first switching duty cycle, the upper bridge arm to operate to output the desired output voltage between the positive half-bus voltage and the zero voltage.

According to one embodiment of the present disclosure, the three-level inverter circuit includes a lower bridge arm. The lower bridge arm includes related circuits outputting the negative bus voltage and the zero voltage. The lower bridge arm has a first terminal electrically connected to the negative bus and a second terminal electrically connected to the bus midpoint. The driving, based on the first switching duty cycle and the second switching duty cycle, the three-level inverter circuit to output the desired output voltage includes: in response to the desired output voltage being the negative voltage, driving, based on the second switching duty cycle, the lower bridge arm to operate to output the desired output voltage between the negative half-bus voltage and the zero voltage.

According to one embodiment of the present disclosure, the voltage modulation method further includes, prior to the determining the desired output voltage for each phase of the three-level inverter circuit: obtaining a state of the neutral line relay, the state of the neutral line relay including the on state and an off state; determining, in response to the state of the neutral line relay being the on state, a voltage modulation strategy as a half-bus modulation strategy; and determining, in response to the state of the neutral line relay being the off state, the voltage modulation strategy as a full-bus modulation strategy.

According to one embodiment of the present disclosure, the voltage modulation method further includes, subsequent to the determining, in response to the state of the neutral line relay being the off state, the voltage modulation strategy as the full-bus modulation strategy: obtaining, in response to the neutral line relay being in the off state, a full bus voltage across the positive bus and the negative bus; determining a third switching duty cycle based on the full bus voltage and the desired output voltage; and driving the three-level inverter circuit to output the desired output voltage based on the third switching duty cycle.

According to one embodiment of the present disclosure, in response to the desired output voltage being a positive voltage, the third switching duty cycle is calculated as:

$$d3 = \frac{Ucmd}{\frac{1}{2}Udc},$$

where d3 denotes the third switching duty cycle, Ucmd denotes the desired output voltage, and Udc denotes the full bus voltage.

According to one embodiment of the present disclosure, in response to the desired output voltage being a negative voltage, the third switching duty cycle is calculated as:

$$d3 = \frac{Ucmd}{-\frac{1}{2}Udc},$$

where d3 denotes the third switching duty cycle, Ucmd denotes the desired output voltage, and Udc denotes the full bus voltage.

According to one embodiment of the present disclosure, the driving the three-level inverter circuit to output the desired output voltage based on the third switching duty cycle includes: in response to the desired output voltage being a positive voltage, modulating, based on the third switching duty cycle, an output voltage of the three-level inverter circuit between outputting the positive half-bus voltage and outputting a zero voltage to output the desired output voltage; and in response to the desired output voltage being a negative voltage, modulating, based on the third switching duty cycle, the output voltage of the three-level inverter circuit between outputting the negative half-bus voltage and outputting the zero voltage to output the desired output voltage.

According to one embodiment of the present disclosure, the three-level inverter circuit includes an upper bridge arm. The upper bridge arm includes related circuits outputting the positive bus voltage and the zero voltage. The upper bridge arm has a first terminal electrically connected to the positive bus and a second terminal electrically connected to the bus midpoint. The driving, based on the third switching duty cycle, the three-level inverter circuit to output the desired output voltage includes: in response to the desired output voltage being the positive voltage, driving, based on the third switching duty cycle, the upper bridge arm to operate to output the desired output voltage between the positive half-bus voltage and the zero voltage.

According to one embodiment of the present disclosure, the three-level inverter circuit includes a lower bridge arm. The lower bridge arm includes related circuits outputting the negative bus voltage and the zero voltage. The lower bridge arm has a first terminal electrically connected to the negative bus and a second terminal electrically connected to the bus midpoint. The driving, based on the third switching duty cycle, the three-level inverter circuit to output the desired output voltage includes: in response to the desired output voltage being the negative voltage, driving, based on the third switching duty cycle, the lower bridge arm to operate to output the desired output voltage between the negative half-bus voltage and the zero voltage.

In a second aspect, the present disclosure provides a three-level inverter. The three-level inverter includes: an inverter circuit; and a controller electrically connected to the inverter circuit and configured to implement the voltage modulation method according to the foregoing.

With the three-level inverter according to the present disclosure, voltage modulation is performed by the controller based on the positive half-bus voltage, the negative half-bus voltage, and the desired output voltage. When there is an imbalance between the positive bus voltage and the negative bus voltage, the actual output voltage is not affected by voltage deviation, in such a manner that the actual output voltage is consistent with the desired voltage, and thus accuracy of the output voltage of the inverter is improved, reducing harmonics of the output voltage and an output current of the inverter.

According to one embodiment of the present disclosure, the inverter circuit includes a neutral line relay. The neutral line relay has a first terminal electrically connected to in a bus midpoint of the inverter circuit, and a second terminal electrically connected to a neutral line of a power grid. The controller is configured to determine, in response to the neutral line relay being in an on state, a switching duty cycle based on a desired output voltage and a half-bus voltage between a bus and the bus midpoint, and determine, in response to the neutral line relay being in an off state, the switching duty cycle based on the desired output voltage and a full bus voltage.

Additional aspects and advantages of the present disclosure will be provided at least in part in the following description, or will become apparent at least in part from the following description, or can be learned from practicing of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings.

FIG. 1 is a circuit diagram of a three-level inverter circuit according to an embodiment of the present disclosure.

FIG. 2 is a chart illustrating a relationship between an operating state and an output voltage of a switch according to an embodiment of the present disclosure.

FIG. 3 is a waveform diagram of voltage modulation according to an embodiment of the present disclosure.

Figure 4:
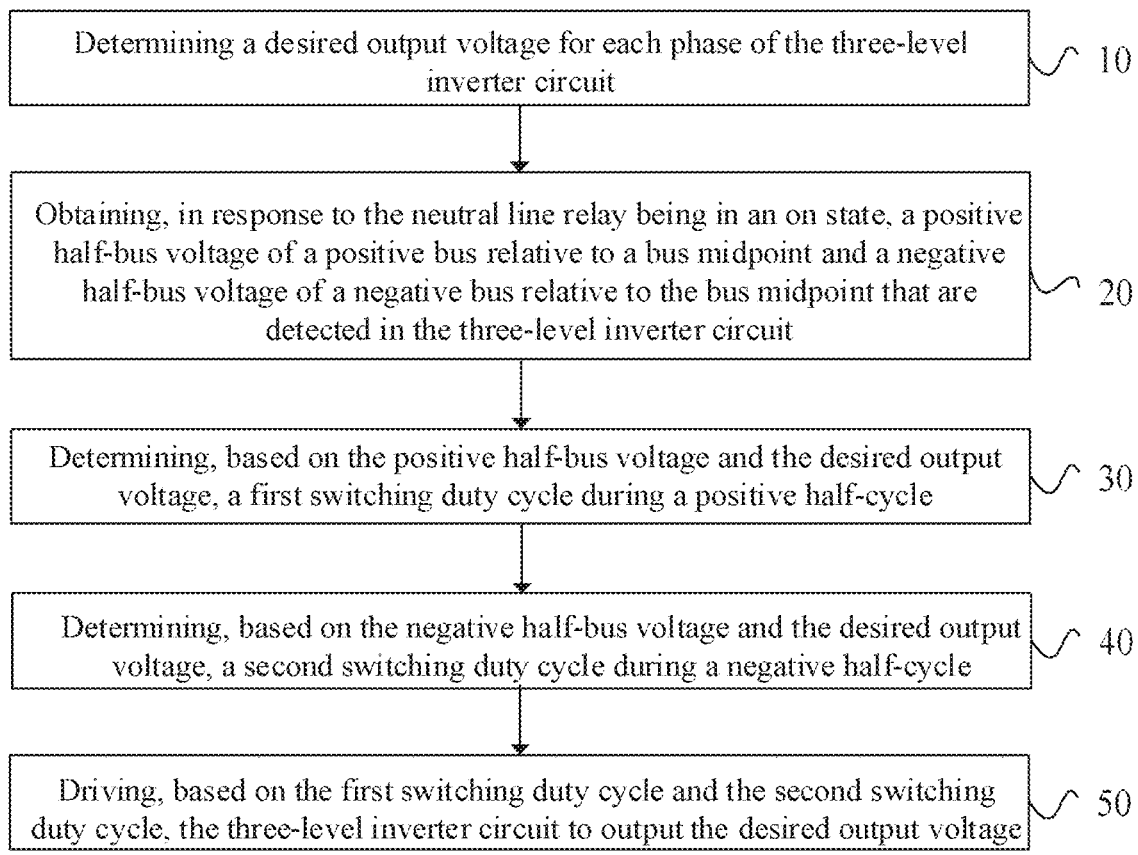
FIG. 4 is a flowchart illustrating a voltage modulation method according to an embodiment of the present disclosure.

REFERENCE NUMERALS OF THE ACCOMPANYING DRAWINGS first capacitor C1; second capacitor C2; first switch Sa1; second switch Sa2; third switch Sa3; fourth switch Sa4; neutral line relay N.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the embodiments of the present disclosure.

In the following description, a "circuit" refers to an electrically conductive loop composed of at least one element or sub-circuit through electrical connection or electromagnetic connection. When a component or a circuit is described as "coupled to" or "connected to" another component, or a component/circuit is said to be "coupled between" or "connected between" two nodes, it can be directly coupled or connected to the other component, or intermediate components may exist. Connection between components can be physical, logical, or a combination of both. Conversely, when the element is said to be "directly coupled to" or "directly connected to" another element, it means that there is no intermediate element between the two nodes.

In the description, terms such as "first" and "second" are used to distinguish between similar objects, rather than to describe a particular order or sequence. It should be understood that numerical descriptors as used can be interchanged where appropriate, to enable the embodiments of the present disclosure described herein to be implemented in an order other than that illustrated or described herein. Also, the objects distinguished by the terms such as "first" and "second" are usually objects of the same type. The quantity of the objects is not limited. For example, one or a plurality of first objects may be provided. In addition, "and/or" throughout the specification and appended claims indicates at least one of the objects associated with "and/or". The character "/" generally indicates that the associated objects before and after the character are in an "or" relationship.

In addition, the description with reference to the terms "one embodiment," "some embodiments," "illustrative embodiments", "an example," "a specific example," or "some examples," etc., means that specific features, structures, materials, or characteristics described in conjunction with the embodiment(s) or example(s) are included in at least one embodiment or example of the present disclosure. The appearances of the above phrases in various places throughout this specification are not necessarily referring to the same embodiment or example. In addition, the particular features, structures, materials, or characteristics described may be combined in any suitable manner in any one or more embodiments or examples.

As illustrated in FIG. 1, a three-level inverter includes a three-level inverter circuit. To better illustrate a voltage modulation method according to the present disclosure, the three-level inverter circuit is introduced. The three-level inverter circuit includes a first capacitor C1, a second capacitor C2, a first switch Sa1, a second switch Sa2, a third switch Sa3, and a fourth switch Sa4. The first capacitor has a first terminal electrically connected to a positive bus, and a second terminal electrically connected to a first terminal of the second capacitor C2. A second terminal of the second capacitor C2 is electrically connected to a negative bus. An output voltage of the inverter can be controlled by controlling on and off of the first switch Sa1, on and off of the second switch Sa2, on and off of the third switch Sa3, and on and off of the fourth switch Sa4.

It should be noted that, a specific type and a number of phases of the three-level inverter circuit are not limited in the present disclosure. As illustrated in FIG. 1, a configuration of the three-level inverter circuit is only described as an example.

As illustrated in FIG. 2 to FIG. 3, when the first switch Sa1, the second switch Sa2, the third switch Sa3 and the fourth switch Sa4 all operates normally, there are three types of on-off combinations of the switches as shown in the figure, and output voltage levels at a bus midpoint O are Upos, 0, or –Uneg, respectively. When the bus midpoint O outputs a positive voltage, the second switch Sa2 remains closed, the fourth switch Sa4 remains open, and the first switch Sa1 and the third switch Sa3 operate in complementary conduction. By adjusting a duty cycle of either the first switch Sa1 or the third switch Sa3, the output voltage can be modulated with 0 and Upos. When the bus midpoint O outputs a negative voltage, the third switch Sa3 remains closed, the first switch Sa1 remains open, and the second switch Sa2 and the fourth switch Sa4 operate in complementary conduction. By adjusting a duty cycle of either the second switch Sa2 or the fourth switch Sa4, the output voltage can be modulated with 0 and –Uneg.

In the related art, when voltage modulation is performed, it is defaulted that a voltage across the first capacitor C1 and a voltage across the second capacitor C2 are equal to each other and equal to a half of a full bus voltage Udc. Therefore, when a positive voltage is output, if a desired output voltage is Ucmd (positive), the duty cycle of the first switch Sa1 is $$d = \frac{Ucmd}{\frac{1}{2}Udc},$$

and the third switch Sa3 and the first switch Sa1 operate in complementary conduction. When a negative voltage is output, if the desired output voltage is Ucmd (negative), the duty cycle of the fourth switch Sa4 is $$d = \frac{Ucmd}{-\frac{1}{2}Udc},$$

and the second switch Sa2 and the fourth switch Sa4 operate in complementary conduction.

However, during actual operation, there may be an imbalance between a positive bus voltage and a negative bus voltage. For example, a full bus voltage is Udc, the positive bus voltage is $$\frac{1}{2}Udc + \Delta U,$$

the negative bus voltage is $$\frac{1}{2}Udc - \Delta U.$$

When the positive voltage needs to be output, and the desired output voltage is Ucmd, an actual output voltage is $$Uact = d*\left(\frac{1}{2}Udc + \Delta U\right) = \frac{Ucmd}{\frac{1}{2}Udc}\left(\frac{1}{2}Udc + \Delta U\right) = Ucmd + \frac{Ucmd}{\frac{1}{2}Udc}\Delta U.$$

Similarly, when the negative voltage needs to be output, and the desired output voltage is Ucmd (negative), the actual output voltage is:

$$Uact = -Ucmd + \frac{Ucmd}{\frac{1}{2}Udc}\Delta U.$$

It can be seen that when the voltage modulation is performed based on a full bus voltage, if there is an imbalance between a positive bus and a negative bus, there are voltage deviation of $$\frac{Ucmd}{\frac{1}{2}Udc}\Delta U.$$

As illustrated in FIG. 4, an embodiment of the present disclosure provides a voltage modulation method applied to a three-level inverter circuit. The three-level inverter circuit includes a neutral line relay disposed at a neutral line of the three-level inverter circuit. The voltage modulation method includes Step 10, Step 20, Step 30, and Step 40.

At Step 10, a desired output voltage for each phase of the three-level inverter circuit is determined.

At Step 20, in response to the neutral line relay being in an on state, a positive half-bus voltage of a positive bus relative to a bus midpoint and a negative half-bus voltage of a negative bus relative to the bus midpoint that are detected in the three-level inverter circuit are obtained.

At Step 30, based on the positive half-bus voltage and the desired output voltage, a first switching duty cycle during a positive half-cycle is determined.

At Step 40, based on the negative half-bus voltage and the desired output voltage, a second switching duty cycle during a negative half-cycle is determined.

At Step 50, based on the first switching duty cycle and the second switching duty cycle, the three-level inverter circuit is driven to output the desired output voltage.

The three-level inverter circuit includes the first switch Sa1, the second switch Sa2, the third switch Sa3, and the fourth switch Sa4. A driving terminal of each switch is electrically connected to a controller. The controller applies a driving signal to the driving terminal of each switch to drive the on and the off of each switch.

The three-level inverter circuit includes a neutral line relay N. The neutral line relay has a first terminal electrically connected to a bus midpoint of the three-level inverter circuit, and a second terminal electrically connected to a neutral line of a power grid. When there is an imbalance in loads among the phases, the neutral line relay N can be controlled to turn on to support current flow through the neutral line.

The neutral line relay N is mainly used for current flow through the neutral line when there is an imbalance in the loads among the phases. A specific type of the neutral line relay N can be selected according to actual application scenarios, which is not limited here. For example, the neutral line relay N can be an Metal-Oxide-Semiconductor Field-Effect Transistor (MOSFET) or an Insulated-Gate Bipolar Transistor (IGBT). In addition, the neutral line relay N can be a relay or a group of relays connected in series-parallel, whose essential function is to enable or disable of connection between the bus midpoint and a neutral line of the power grid. A number of neutral line relays and a form of series-parallel connection of neutral line relays are not limited herein. A state of neutral line relay herein represents a connection state between the bus midpoint and the neutral line of the power grid.

Embodiments of the present disclosure provide a voltage modulation method. An executing entity of the modulation method may be the aforementioned controller or a functional module or a functional entity within the controller capable of implementing the modulation method. The modulation method according to the embodiments of the present disclosure is described as an example below by taking the controller as the executing entity.

The positive half-bus voltage Upos of the positive bus relative to the bus midpoint can be obtained by detecting the voltage across the first capacitor C1. The negative half-bus voltage Uneg of a negative bus relative to the bus midpoint can be obtained by detecting the voltage across the second capacitor C2.

The desired output voltage refers to an ideal output voltage at an output terminal during operation of the three-level inverter. A value of the desired output voltage is different at different stages of the operation of the three-level inverter.

During the positive half-cycle, the second switch Sa2 remains closed, the fourth switch Sa4 remains open, and the first switch Sa1 and the third switch Sa3 operate in complementary conduction. Based on a ratio of the positive half-bus voltage Upos to the desired output voltage Ucmd, the first duty cycle of the first switch Sa1 or the first duty cycle of the third switch Sa3 can be determined. By applying driving signals to the first switch Sa1 or the third switch Sa3 based on the first duty cycle, a desired positive output voltage can be output.

During the negative half-cycle, the third switch Sa3 remains closed, the first switch Sa1 remains open, and the second switch Sa2 and the fourth switch Sa4 operate in complementary conduction. Based on a ratio of the negative half-bus voltage Uneg to the desired output voltage Ucmd, the second duty cycle of the second switch Sa2 or the second duty cycle of the fourth switch Sa4 can be determined. By applying driving signals to the second switch Sa2 or the fourth switch Sa4 based on the second duty cycle, the desired negative output voltage can be output.

It should be noted that, whether the positive half-bus voltage Upos and the negative half-bus voltage Uneg are balanced or not, a sum of the positive half-bus voltage Upos and the negative half-bus voltage Uneg always equals a full bus voltage Udc. By determining a duty cycle of the switches based on the positive half-bus voltage Upos, the negative half-bus voltage Uneg, and the desired output voltage Ucmd, and then performing modulation, the actual output voltage can be made unaffected by deviation between the positive bus voltage and the negative bus voltage.

With the voltage modulation method according to the present disclosure, voltage modulation is performed based on the positive half-bus voltage, the negative half-bus voltage, and the desired output voltage. When the positive bus voltage and the negative bus voltage are unbalanced, the actual output voltage is not affected by voltage deviation, in such a manner that the actual output voltage is consistent with the desired voltage, and thus accuracy of an output voltage of an inverter circuit is improved, reducing harmonics of an output voltage and an output current of the inverter circuit.

In some embodiments, the first switching duty cycle is calculated as:

$$d1 = \frac{Ucmd}{Upos},$$

where d1 denotes the first switching duty cycle, Ucmd denotes the desired output voltage, and Upos denotes the positive half-bus voltage.

When a detected voltage of the positive bus relative to a midpoint O of the bus is Upos, and the desired output voltage Ucmd is the positive voltage, the first switching duty cycle is $$d1 = \frac{Ucmd}{Upos}.$$

In this case, the actual output voltage is $$Uact = d1 * Upos = \frac{Ucmd}{Upos} * Upos = Ucmd.$$

It can be seen that the actual output voltage calculated by the positive bus voltage and the desired output voltage is consistent with the desired output voltage.

In some embodiments, the second switching duty cycle is calculated as:

$$d2 = \frac{Ucmd}{-Uneg},$$

where d2 denotes the second switching duty cycle, Ucmd denotes the desired output voltage, and Uneg denotes the negative half-bus voltage.

When a detected voltage of the bus midpoint O relative to the negative bus is Uneg, and the desired output voltage Ucmd is the negative voltage, the second switching duty cycle is $$d2 = \frac{Ucmd}{-Uneg}.$$

In this case, the actual output voltage is $$Uact = d2 * (-Uneg) = \frac{Ucmd}{-Uneg} * (-Uneg) = Ucmd.$$

It can be seen that the actual output voltage calculated by the negative bus voltage and the desired output voltage is consistent with the desired output voltage.

In some embodiments, the driving, based on the first switching duty cycle and the second switching duty cycle, the three-level inverter circuit to output the desired output voltage includes: in response to the desired output voltage being a positive voltage, modulating, based on the first switching duty cycle, an output voltage of the three-level inverter circuit between outputting the positive half-bus voltage and outputting a zero voltage to output the desired output voltage; and in response to the desired output voltage being a negative voltage, modulating, based on the second switching duty cycle, the output voltage of the three-level inverter circuit between the negative half-bus voltage and the zero voltage output to output the desired output voltage.

When the desired output voltage is the positive voltage, the second switch Sa2 remains closed, the fourth switch Sa4 remains open, and the first switch Sa1 and the third switch Sa3 operate in complementary conduction. By adjusting the duty cycle of either the first switch Sa1 or the duty cycle of the third switch Sa3, a desired positive output voltage can be output.

When the desired output voltage is the negative voltage, the third switch Sa3 remains closed, the first switch Sa1 remains open, and the second switch Sa2 and the fourth switch Sa4 operate in complementary conduction. By adjusting the duty cycle of either the second switch Sa2 or the duty cycle of the fourth switch Sa4, a desired negative output voltage can be output.

In some embodiments, the three-level inverter circuit includes an upper bridge arm. The upper bridge arm includes related circuits outputting the positive bus voltage and the zero voltage. The upper bridge arm has a first terminal electrically connected to the positive bus and a second terminal electrically connected to the bus midpoint. The driving, based on the first switching duty cycle and the second switching duty cycle, the three-level inverter circuit to output the desired output voltage includes: in response to the desired output voltage being the positive voltage, driving, based on the first switching duty cycle, the upper bridge arm to operate to output the desired output voltage between the positive half-bus voltage and the zero voltage.

When the first switch Sa1, the second switch Sa2, the third switch Sa3, and the fourth switch Sa4 all operate normally, there are three types of on-off combinations of the switches as shown in the figures, and output voltage levels are Upos, 0, or −Uneg, respectively. When the desired output voltage is the positive voltage, the second switch Sa2 remains closed, the fourth switch Sa4 remains open, and the first switch Sa1 and the third switch Sa3 operate in complementary conduction. By adjusting the duty cycle of the first switch Sa1 and the duty cycle of the third switch Sa3, the output voltage can be modulated with 0 and Upos.

In some embodiments, the three-level inverter circuit includes a lower bridge arm. The lower bridge arm includes related circuits outputting the negative bus voltage and the zero voltage. The lower bridge arm has a first terminal electrically connected to the positive bus and a second terminal electrically connected to the bus midpoint. The driving, based on the first switching duty cycle and the second switching duty cycle, the three-level inverter circuit to output the desired output voltage includes: in response to the desired output voltage being the negative voltage, driving, based on the second switching duty cycle, the lower bridge arm to operate to output the desired output voltage between the negative half-bus voltage and the zero voltage.

When the desired output voltage is the negative voltage, the third switch Sa3 remains closed, the first switch Sa1 remains open, and the second switch Sa2 and the fourth switch Sa4 operate in complementary conduction. By adjusting the duty cycle of the second switch Sa2 and the duty cycle of the fourth switch Sa4, the output voltage can be modulated between the zero voltage and −Uneg.

In some embodiments, the voltage modulation method further includes, prior to the determining the desired output voltage for each phase of the three-level inverter circuit: obtaining a state of the neutral line relay N, the state of the neutral line relay N including the on state and an off state; determining, in response to the state of the neutral line relay N being the on state, a voltage modulation strategy as a half-bus modulation strategy; and determining, in response to the state of the neutral line relay N being the off state, the voltage modulation strategy as a full-bus modulation strategy.

When the neutral line relay N is in the on state, the voltage modulation strategy is determined as the half-bus modulation strategy, and the voltage modulation is performed based on the half-bus voltage of the positive bus or the negative bus relative to the bus midpoint and the desired output voltage.

When the neutral line relay N is in the off state, the voltage modulation strategy is determined as the full-bus modulation strategy, and the voltage modulation is performed based on the full bus voltage and the desired output voltage.

In some embodiments, the voltage modulation method further includes, subsequent to the determining, in response to the state of the neutral line relay being the off state, the voltage modulation strategy as the full-bus modulation strategy: obtaining, in response to the voltage modulation strategy being the full-bus modulation strategy, a full bus voltage across the positive bus and the negative bus; determining a third switching duty cycle based on the full bus voltage and the desired output voltage; and driving, based on third the switching duty cycle, the three-level inverter circuit to output the desired output voltage.

When the neutral line relay N in the three-level inverter circuit is in the off state, the full-bus voltage modulation strategy is used. In this case, the third switching duty cycle is determined based on a ratio between the desired output voltage and the bus voltage.

In some embodiments, in response to the desired output voltage being a positive voltage, the third switching duty cycle is calculated as:

$$d3 = \frac{Ucmd}{\frac{1}{2}Udc},$$

where d3 denotes the third switching duty cycle, Ucmd denotes the desired output voltage, and Udc denotes the full bus voltage.

When the positive voltage is output, if the desired output voltage is Ucmd (positive), the duty cycle of the first switch Sa1 can be $$d3 = \frac{Ucmd}{\frac{1}{2}Udc},$$

and the third switch Sa3 operates in complementary conduction with the first switch Sa1.

The third switching duty cycle is determined based on the ratio between the desired output voltage and the full bus voltage. When the neutral line relay N is off, a voltage difference between the positive bus voltage and the negative bus voltage may not be further expanded due to voltage modulation.

In some embodiments, in response to the desired output voltage being a positive voltage, the third switching duty cycle is calculated as:

$$d3 = \frac{Ucmd}{-\frac{1}{2}Udc},$$

where d3 denotes the third switching duty cycle, Ucmd denotes the desired output voltage, and Udc denotes the full bus voltage.

When outputting the negative voltage, if the desired output voltage is Ucmd (negative), the duty cycle of the fourth switch Sa4 can be $$d3 = \frac{Ucmd}{-\frac{1}{2}Udc},$$

and the second switch Sa2 operates in complementary conduction with the fourth switch Sa4.

The third switching duty cycle is determined based on the ratio between the desired output voltage and the full bus voltage. When the neutral line relay N is off, the voltage difference between the positive bus voltage and the negative bus voltage may not be further expanded due to voltage modulation.

In some embodiments, the driving the three-level inverter circuit to output the desired output voltage based on the third switching duty cycle includes: in response to the desired output voltage being a positive voltage, modulating, based on the third switching duty cycle, an output voltage of the three-level inverter circuit between outputting the positive half-bus voltage and outputting a zero voltage to output the desired output voltage; and in response to the desired output voltage being a negative voltage, modulating, based on the third switching duty cycle, the output voltage of the three-level inverter circuit between outputting the negative half-bus voltage and outputting the zero voltage output to output the desired output voltage.

When the desired output voltage is the positive voltage, the second switch Sa2 remains closed, the fourth switch Sa4 remains open, and the first switch Sa1 and the third switch Sa3 operate in complementary conduction. By adjusting the duty cycle of either the first switch Sa1 or the duty cycle of the third switch Sa3, the desired positive output voltage can be output.

When the desired output voltage is the negative voltage, the third switch Sa3 remains closed, the first switch Sa1 remains open, and the second switch Sa2 and the fourth switch Sa4 operate in complementary conduction. By adjusting the duty cycle of either the second switch Sa2 or the duty cycle of the fourth switch Sa4, the desired negative output voltage can be output.

In some embodiments, the three-level inverter circuit includes an upper bridge arm. The upper bridge arm includes related circuits outputting the positive bus voltage and the zero voltage. The upper bridge arm has a first terminal electrically connected to the positive bus and a second terminal electrically connected to the bus midpoint. The driving, based on the third switching duty cycle, the three-level inverter circuit to output the desired output voltage includes: in response to the desired output voltage being the positive voltage, driving, based on the third switching duty cycle, the upper bridge arm to operate to output the desired output voltage between the positive bus voltage and the zero voltage.

Under full bus modulation, if the desired output voltage is the positive voltage, the second switch Sa2 remains closed, the fourth switch Sa4 remains open, and the first switch Sa1 and the third switch Sa3 operate in complementary conduction. By adjusting the duty cycle of either switch Sa1 or the duty cycle of the third switch Sa3, the output voltage can be modulated between the zero voltage and the positive bus voltage.

In some embodiments, the three-level inverter circuit includes a lower bridge arm. The lower bridge arm includes related circuits outputting the negative bus voltage and the zero voltage. The lower bridge arm has a first terminal electrically connected to the positive bus and a second terminal electrically connected to the bus midpoint. The driving, based on the third switching duty cycle, the three-level inverter circuit to output the desired output voltage includes: in response to the desired output voltage being the negative voltage, driving, based on the third switching duty cycle, the lower bridge arm to operate to output the desired output voltage between the negative half-bus voltage and the zero voltage.

Under the full bus modulation, if the desired output voltage is the negative voltage, the third switch Sa3 remains closed, the first switch Sa1 remains open, and the second switch Sa2 and the fourth switch Sa4 operate in complementary conduction. By adjusting the duty cycle of either the second switch Sa2 or the duty cycle of the fourth switch Sa4, the output voltage can be modulated between the zero voltage and the negative bus voltage.

An embodiment of the present disclosure provides a three-level inverter. The three-level inverter includes: an inverter circuit; and a controller electrically connected to the inverter circuit and configured to implement the voltage modulation method according to the foregoing.

The controller is configured to obtain the detected voltage in the three-level inverter circuit and the desired output voltage. The voltage modulation strategy is determined based on a state of the neutral line relay in the three-level inverter circuit. Then, the switching duty cycle is determined based on the voltage modulation strategy, the detected voltage, and the desired output voltage, and the three-level inverter circuit is driven to output the desired voltage based on the switching duty cycle.

Reference can be made to the foregoing embodiments for the specific principles and steps of the voltage modulation method, and details thereof will be omitted here.

With the three-level inverter according to the present disclosure, voltage modulation is performed by the controller based on the positive half-bus voltage, the negative half-bus voltage, and the desired output voltage. The switching duty cycle can be a ratio of the desired voltage and a detected voltage of the bus relative to a neutral point. When there is an imbalance between the positive bus voltage and the negative bus voltage, the actual output voltage is not affected by the voltage deviation, in such a manner that the actual output voltage is consistent with the desired voltage, and thus the accuracy of the output voltage of the inverter circuit is improved, reducing harmonics of the output voltage and the output current of the inverter circuit.

In some embodiments, the inverter circuit includes a neutral line relay N. The neutral line relay N has a first terminal electrically connected to a bus midpoint of the inverter circuit, and a second terminal electrically connected to a neutral line of a power grid. The controller is configured to determine, in response to the neutral line relay N being in an on state, a switching duty cycle based on a desired output voltage and a half-bus voltage between a positive bus or a negative bus and the bus midpoint, and determine, in response to the neutral line relay N being in an off state, the third switching duty cycle based on the desired output voltage and a full bus voltage.

The voltage modulation strategy includes a half-bus modulation strategy and a full-bus modulation strategy. When the neutral line relay N is in the on state, the half-bus modulation strategy is adopted to drive the phase inverter circuit. When the neutral line relay N is in the off state, the full-bus modulation strategy is adopted to drive the phase inverter circuit. The controller selects a corresponding voltage modulation strategy according to the operation condition of the neutral line relay N, which can ensure accuracy of the output voltage for each phase of the three-level inverter circuit under different operation conditions, thus ensuring accuracy of a final output voltage.

Although embodiments of the present disclosure have been illustrated and described, it is conceivable for those skilled in the art that various changes, modifications, replacements, and variations can be made to these embodiments without departing from the principles and spirit of the present disclosure. The scope of the present disclosure shall be defined by the claims as appended and their equivalents.

What is claimed is:

1. A voltage modulation method, applied to a three-level inverter circuit, the three-level inverter circuit comprising a neutral line relay disposed at a neutral line of the three-level inverter circuit, wherein the voltage modulation method comprises:
   determining a desired output voltage for each phase of the three-level inverter circuit, the desired output voltage referring to an ideal output voltage during operation of the three-level inverter circuit;
   obtaining, in response to the neutral line relay being in an on state, a positive half-bus voltage of a positive bus relative to a bus midpoint and a negative half-bus voltage of a negative bus relative to the bus midpoint that are detected in the three-level inverter circuit, wherein the positive half-bus voltage is obtained by detecting a voltage across a first capacitor connected between the positive bus and the bus midpoint, and the negative half-bus voltage is obtained by detecting a voltage across a second capacitor connected between the negative bus and the bus midpoint;
   determining, based on the positive half-bus voltage and the desired output voltage, a first switching duty cycle during a positive half-cycle;
   determining, based on the negative half-bus voltage and the desired output voltage, a second switching duty cycle during a negative half-cycle; and
   driving, based on the first switching duty cycle and the second switching duty cycle, the three-level inverter circuit such that an actual output voltage outputted by the three-level inverter circuit is equal to the desired output voltage.

2. The voltage modulation method according to claim 1, wherein the first switching duty cycle is calculated as:

$$d1 = \frac{Ucmd}{Upos}$$

where d1 denotes the first switching duty cycle, Ucmd denotes the desired output voltage, and Upos denotes the positive half-bus voltage.

3. The voltage modulation method according to claim 1, wherein the second switching duty cycle is calculated as:

$$d2 = \frac{Ucmd}{-Uneg},$$

where d2 denotes the second switching duty cycle, Ucmd denotes the desired output voltage, and Uneg denotes the negative half-bus voltage.

4. The voltage modulation method according to claim 1, wherein said driving, based on the first switching duty cycle and the second switching duty cycle, the three-level inverter circuit such that the actual output voltage outputted by the three-level inverter circuit is equal to the desired output voltage comprises:
    in response to the desired output voltage being a positive voltage, modulating, based on the first switching duty cycle, an output voltage of the three-level inverter circuit between outputting the positive half-bus voltage and outputting a zero voltage such that the actual output voltage outputted by the three-level inverter circuit is equal to the desired output voltage; and
    in response to the desired output voltage being a negative voltage, modulating, based on the second switching duty cycle, the output voltage of the three-level inverter circuit between outputting the negative half-bus voltage and outputting the zero voltage such that the actual output voltage outputted by the three-level inverter circuit is equal to the desired output voltage.

5. The voltage modulation method according to claim 4, wherein the three-level inverter circuit comprises an upper bridge arm, the upper bridge arm having a first terminal electrically connected to the positive bus and a second terminal electrically connected to the bus midpoint, wherein said driving, based on the first switching duty cycle and the second switching duty cycle, the three-level inverter circuit such that the actual output voltage outputted by the three-level inverter circuit is equal to the desired output voltage comprises:
    in response to the desired output voltage being the positive voltage, driving, based on the first switching duty cycle, the upper bridge arm to operate such that the actual output voltage outputted by the three-level inverter circuit is equal to the desired output voltage between the positive half-bus voltage and the zero voltage.

6. The voltage modulation method according to claim 4, wherein the three-level inverter circuit comprises a lower bridge arm, the lower bridge arm having a first terminal electrically connected to the negative bus and a second terminal electrically connected to the bus midpoint, wherein said driving, based on the first switching duty cycle and the second switching duty cycle, the three-level inverter circuit such that the actual output voltage outputted by the three-level inverter circuit is equal to the desired output voltage comprises:
    in response to the desired output voltage being the negative voltage, driving, based on the second switching duty cycle, the lower bridge arm to operate such that the actual output voltage outputted by the three-level inverter circuit is equal to the desired output voltage between the negative half-bus voltage and the zero voltage.

7. The voltage modulation method according to claim 1, further comprising, prior to said determining the desired output voltage for each phase of the three-level inverter circuit:
    obtaining a state of the neutral line relay, the state of the neutral line relay comprising the on state and an off state;
    determining, in response to the state of the neutral line relay being the on state, a voltage modulation strategy as a half-bus modulation strategy; and
    determining, in response to the state of the neutral line relay being the off state, the voltage modulation strategy as a full-bus modulation strategy.

8. The voltage modulation method according to claim 7, further comprising, subsequent to said determining, in response to the state of the neutral line relay being the off state, the voltage modulation strategy as the full-bus modulation strategy:
    obtaining, in response to the neutral line relay being in the off state, a full bus voltage across the positive bus and the negative bus;
    determining a third switching duty cycle based on the full bus voltage and the desired output voltage; and
    driving, based on the third switching duty cycle, the three-level inverter circuit such that the actual output voltage outputted by the three-level inverter circuit is equal to the desired output voltage.

9. The voltage modulation method according to claim 8, wherein in response to the desired output voltage being a positive voltage, the third switching duty cycle is calculated as:

$$d3 = \frac{Ucmd}{\frac{1}{2}Udc}$$

where d3 denotes the third switching duty cycle, Ucmd denotes the desired output voltage, and Udc denotes the full bus voltage.

10. The voltage modulation method according to claim 8, wherein in response to the desired output voltage being a negative voltage, the third switching duty cycle is calculated as:

$$d3 = \frac{Ucmd}{-\frac{1}{2}Udc}$$

where d3 denotes the third switching duty cycle, Ucmd denotes the desired output voltage, and Udc denotes the full bus voltage.

11. The voltage modulation method according to claim 8, wherein said driving, based on the third switching duty cycle, the three-level inverter circuit such that the actual output voltage outputted by the three-level inverter circuit is equal to the desired output voltage comprises:

in response to the desired output voltage being a positive voltage, modulating, based on the third switching duty cycle, an output voltage of the three-level inverter circuit between outputting the positive half-bus voltage and outputting a zero voltage such that the actual output voltage outputted by the three-level inverter circuit is equal to the desired output voltage; and in response to the desired output voltage being a negative voltage, modulating, based on the third switching duty cycle, the output voltage of the three-level inverter circuit between an outputting the negative half-bus voltage and outputting the zero voltage such that the actual output voltage outputted by the three-level inverter circuit is equal to the desired output voltage.

12. The voltage modulation method according to claim 11, wherein the three-level inverter circuit comprises an upper bridge arm, the upper bridge arm having a first terminal electrically connected to the positive bus and a second terminal electrically connected to the bus midpoint, wherein said driving, based on the third switching duty cycle, the three-level inverter circuit such that the actual output voltage outputted by the three-level inverter circuit is equal to the desired output voltage comprises:

in response to the desired output voltage being the positive voltage, driving, based on the third switching duty cycle, the upper bridge arm to operate such that the actual output voltage outputted by the three-level inverter circuit is equal to the desired output voltage between the positive half-bus voltage and the zero voltage.

13. The voltage modulation method according to claim 11, wherein the three-level inverter circuit comprises a lower bridge arm, the lower bridge arm having a first terminal electrically connected to the negative bus and a second terminal electrically connected to the bus midpoint, wherein said driving, based on the third switching duty cycle, the three-level inverter circuit such that the actual output voltage outputted by the three-level inverter circuit is equal to the desired output voltage comprises:

in response to the desired output voltage being the negative voltage, driving, based on the switching duty cycle, the lower bridge arm to operate such that the actual output voltage outputted by the three-level inverter circuit is equal to the desired output voltage between the negative half-bus voltage and the zero voltage.

14. A three-level inverter, comprising:
a three-level inverter circuit, the three-level inverter circuit comprising a neutral line relay disposed at a neutral line of the three-level inverter circuit; and
a controller electrically connected to the inverter circuit and configured to:
determine a desired output voltage for each phase of the three-level inverter circuit, the desired output voltage referring to an ideal output voltage during operation of the three-level inverter circuit;
obtain, in response to the neutral line relay being in an on state, a positive half-bus voltage of a positive bus relative to a bus midpoint and a negative half-bus voltage of a negative bus relative to the bus midpoint that are detected in the three-level inverter circuit, wherein the positive half-bus voltage is obtained by detecting a voltage across a first capacitor connected between the positive bus and the bus midpoint, and the negative half-bus voltage is obtained by detecting a voltage across a second capacitor connected between the negative bus and the bus midpoint;

determine, based on the positive half-bus voltage and the desired output voltage, a first switching duty cycle during a positive half-cycle;

determine, based on the negative half-bus voltage and the desired output voltage, a second switching duty cycle during a negative half-cycle; and drive, based on the first switching duty cycle and the second switching duty cycle, the three-level inverter circuit such that an actual output voltage outputted by the three-level inverter circuit is equal to the desired output voltage.

15. The three-level inverter according to claim 14, wherein the first switching duty cycle is calculated as:

$$d1 = \frac{Ucmd}{Upos}$$

where d1 denotes the first switching duty cycle, Ucmd denotes the desired output voltage, and Upos denotes the positive half-bus voltage.

16. The three-level inverter according to claim 14, wherein the second switching duty cycle is calculated as:

$$d2 = \frac{Ucmd}{-Uneg}$$

where d2 denotes the second switching duty cycle, Ucmd denotes the desired output voltage, and Uneg denotes the negative half-bus voltage.

17. The three-level inverter according to claim 14, wherein the controller is further configured to, prior to said determining the desired output voltage for each phase of the three-level inverter circuit:

obtain a state of the neutral line relay, the state of the neutral line relay comprising the on state and an off state;

determine, in response to the state of the neutral line relay being the on state, a voltage modulation strategy as a half-bus modulation strategy; and determine, in response to the state of the neutral line relay being the off state, the voltage modulation strategy as a full-bus modulation strategy.

18. The three-level inverter according to claim 17, wherein the controller is further configured to, subsequent to said determining, in response to the state of the neutral line relay being the off state, the voltage modulation strategy as the full-bus modulation strategy:

obtain, in response to the neutral line relay being in the off state, a full bus voltage across the positive bus and the negative bus;

determine a third switching duty cycle based on the full bus voltage and the desired output voltage; and drive, based on the third switching duty cycle, the three-level inverter circuit such that the actual output voltage outputted by the three-level inverter circuit is equal to the desired output voltage.

19. The three-level inverter according to claim 18, wherein in response to the desired output voltage being a positive voltage, the third switching duty cycle is calculated as:

$$d3 = \frac{Ucmd}{\frac{1}{2}Udc}$$

where d3 denotes the third switching duty cycle, Ucmd denotes the desired output voltage, and Udc denotes the full bus voltage.

20. The three-level inverter according to claim 18, wherein in response to the desired output voltage being a negative voltage, the third switching duty cycle is calculated as:

$$d3 = \frac{Ucmd}{-\frac{1}{2}Udc}$$

where d3 denotes the third switching duty cycle, Ucmd denotes the desired output voltage, and Udc denotes the full bus voltage.

\* \* \* \* \*